United States Patent [19]

Tateoka et al.

[11] Patent Number: 5,323,183
[45] Date of Patent: Jun. 21, 1994

[54] IMAGE RECORDING APPARATUS

[75] Inventors: Masamichi Tateoka; Toshinori Ando, both of Yokohama, Japan

[73] Assignee: Canon Kabushiki Kaisha, Tokyo, Japan

[21] Appl. No.: 789,867

[22] Filed: Nov. 12, 1991

[30] Foreign Application Priority Data

Nov. 13, 1990 [JP] Japan .................................. 2-306695
Dec. 26, 1990 [JP] Japan .................................. 2-406676
Jun. 18, 1991 [JP] Japan .................................. 3-145991

[51] Int. Cl.⁵ .......................................... B41J 2/435
[52] U.S. Cl. ................................................ 346/108
[58] Field of Search ................. 346/108, 107 R, 76 L, 346/160; 358/296, 298, 300, 302

[56] References Cited

U.S. PATENT DOCUMENTS 4,302,782 11/1981 Gunning et al. ..................... 358/296
4,674,825 6/1987 Tateoka et al. .
4,899,176 2/1990 McQuade ............................. 346/108
4,920,430 4/1990 Isono et al. .......................... 358/494
5,115,328 5/1992 Kadono ............................... 358/486

Primary Examiner—Mark J. Reinhart
Attorney, Agent, or Firm—Fitzpatrick, Cella, Harper & Scinto

[57] ABSTRACT

An image recording apparatus comprises a beam generating unit for generating a light beam modulated in accordance with input image signal, a beam deflecting unit for scanning a recording medium using the light beam generated by the beam generating unit, the beam deflecting unit comprising a rotating polygon mirror having a plurality of reflecting surfaces. The apparatus can be operated in a mode for forming an image using all the reflecting surfaces of the rotating polygon mirror and in a mode for forming an image using predetermined reflecting surfaces of a plurality of reflecting surfaces of the rotating polygon mirror. The apparatus thus permits the dot density to be changed to a plurality of values with a simple structure so that image information can be recorded with high definition on the surface of a recording medium.

17 Claims, 13 Drawing Sheets

IMAGE RECORDING APPARATUS

BACKGROUND OF THE INVENTION

1. Field of the Invention

The present invention relates to an image recording apparatus, and particularly to an image recording apparatus in which a laser beam modulated by an image signal is emitted from a light source such as a semiconductor laser or the like and is used for optically scanning the surface of a recording medium through a deflecting unit such as a rotating polygon mirror or the like to record an image thereon, and which is preferably applied to laser beam printers, facsimile and the like. The image recording apparatus has a variable pixel density in the subscanning direction.

2. Related Background Art

Various image recording apparatuses have previously been proposed in which an image is recorded by optically scanning the surface of a recording medium using the laser beam emitted from a laser source and modulated on the basis of image information through a deflecting unit such as a rotating polygon mirror or the like and a lens system having fθ characteristics.

A laser beam printer of such image recording apparatuses has the characteristics that the noise produced during the operation is low due to its non-impact operation and that high-definition (high-resolution) printing can be relatively easily performed.

In such a laser beam printer, the surface of a recording medium generally has a constant dot density. An example of methods of making the dot density on the surface of the recording medium variable is a method of making the rotation number of a rotating polygon mirror or the speed (rotational speed) of the recording medium in the subscanning direction variable in view of the structure of the laser scanning optical system.

The method of making the rotational number of the rotating polygon mirror variable for making the dot density of image information variable causes deterioration in the basic driving state of a motor used as a driving means. Particularly, the method has the problems that it is difficult to precisely control the changing amount of the rotation number and attempt to stabilize the motor without producing jitters or vibrations when the rotation number is changed.

There is also the problem that the current cannot be set to a minimum value because the rotation number of the motor strictly varies.

In addition, since the rotation number of the motor is within a range optimum for setting, the variable range of the rotation number is within about 50% of the basic rotation number.

Namely, the method of making the rotation number of the polygon mirror variable has difficulty in changing the dot density over a wide range and causes deterioration in quality of the image printed due to the instability of the motor even when the dot density is changed within a narrow range.

Further, for example, when the dot density is doubled both in the main scanning and subscanning directions, the sending speed of the image signal generated from an image signal generating section must be quadrupled. Even when the dot density is changed only in the subscanning direction, the sending speed of the image signal generated from the image signal generating section must be changed. The load on the image signal generating section is thus increased.

On the other hand, the method of making the speed of the recording medium variable causes the need for changing the process conditions of an apparatus which employs an electrophotographic process according to the speed of the recording medium. Since the electrophotographic process includes many units, it is difficult to variably control all the units according to the speed of the recording medium, and this method is thus impossible to attempt to improve image quality.

None of the above methods is thus capable of partially changing the dot density of an image on one page when the electrophotographic process is employed. In addition, although the power of the laser beam emitted from a semiconductor laser must be variably controlled over a wide range according to at least the dot density, this variable control is difficult from the viewpoint of variations in the emission angles of semiconductor laser solids, and the dot density cannot be changed over a wide range.

On the other hand, there has recently been a demand for recording various types of image information by a single laser beam printer. For example, when a half tone is recorded with a high gradation, or when a line image is recorded with higher definition (higher resolution), it is indispensable to change the dot density over a wide range.

SUMMARY OF THE INVENTION

It is an object of the present invention to provide an image recording apparatus which meets the above demand and which permits the dot density to be changed to a plurality of values with a simple structure so that image information can be recorded with high definition on the surface of a recording medium.

In a recording apparatus according to the present invention, when the dot density of an image signal in the subscanning direction is switched in n stages relative to a standard state, the beams of light reflected from, (n−1) surfaces apart, the reflecting surfaces of a plurality of reflecting surfaces of the rotating polygon mirror are used. This enables the dot density in the subscanning direction to be changed with a simple structure. When the dot density of the image information in the main scanning direction is changed, the image clock number may be changed.

It is another object of the present invention to provide an image recording apparatus which permits the dot density to be changed over a wide range.

It is a further object of the present invention to provide an image recording apparatus which produces none of the various problems by changing the dot density.

It is a still further object of the present invention to provide an image recording apparatus which enables a reduction in the load imposed on an image signal generating source when the dot density is changed.

Other objects, advantages and effects of the present invention will be made more apparent from the attached drawings, the detailed description of the invention below and the claims.

DETAILED DESCRIPTION OF THE PREFERRED EMBODIMENTS

Preferred embodiments of the present invention are described below with reference to the drawings.

EMBODIMENT 1

Figure 1:
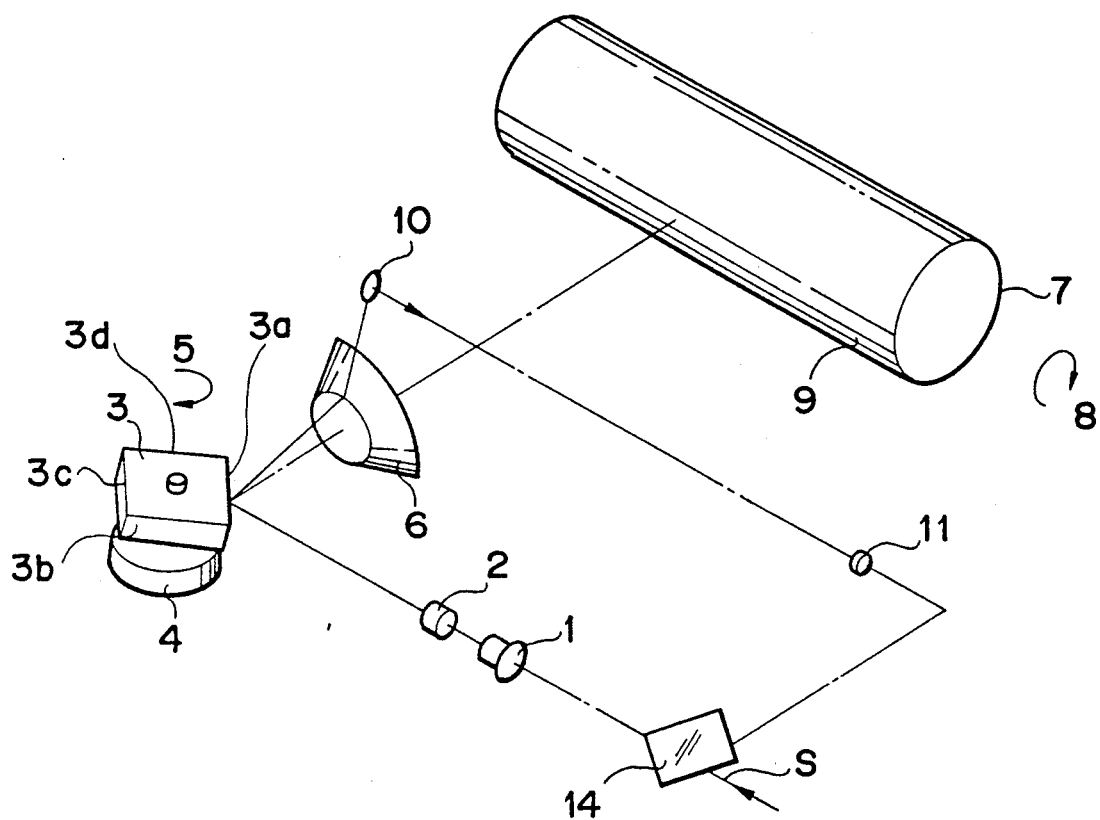
FIG. 1 is a schematic view showing a principal portion of a first embodiment of the present invention.

FIG. 1 is a schematic view showing a principal portion of a first embodiment of the present invention. In this embodiment, the dot density is changed in two stages for the sake of simplicity.

In the drawing, reference numeral 1 denotes a semiconductor laser (referred to as "laser" hereinafter) which emits a laser beam optically modified on the basis of image information S. Reference numeral 2 denotes a collimator lens for applying as a parallel light beam the laser beam emitted from the laser 1 to one reflecting surface 3a of a rotating polygon mirror 3 serving as a deflecting unit and having a plurality of reflecting surfaces.

The rotating polygon mirror 3 has an even number (in the drawings, four) of reflecting surfaces 3a to 3d and is rotated by a motor 4 serving as a driving means at a constant speed in the direction shown by an arrow 5.

The laser beam reflected from a reflecting surface of the rotating polygon mirror 3 is converged by a lens system 6 having f-$\theta$ characteristics and applied to the surface of a photosensitive drum 7 serving as a medium to be scanned (recording medium). The rotation of the rotating polygon mirror 3 causes the surface of the photosensitive drum 7 to be scanned by the laser beam in the main scanning direction.

The photosensitive drum 7 is rotated at a constant speed in the direction shown by an arrow 8 along with the rotation of the rotating polygon mirror 3 so as to be optically scanned in the subscanning direction.

Reference numeral 10 denotes a BD mirror (beam detectomirror) for guiding the laser beam to a light-receiving element (beam detector) 11 through a slit (not shown) having a variable-diameter opening so as to obtain a write synchronizing signal for adjusting the scanning start position on the surface of the photosensitive drum 7.

Reference numeral 14 denotes a control means horizontally synchronizing on the basis of the signal from the light-receiving element 11 so as to control the radiation timing of the laser beam optically modulated on the basis of the image information S.

Namely, in this embodiment, the control means 14 detects the time an appropriate slice level is detected, i.e., the time the laser beam is passed through a predetermined region of the slit opening, in the signal obtained by the light receiving means 11 and horizontally synchronizes so as to write the image information on the surface of the photosensitive drum 7 after a predetermined number of pulses have been passed since the detected time.

Figure 2:
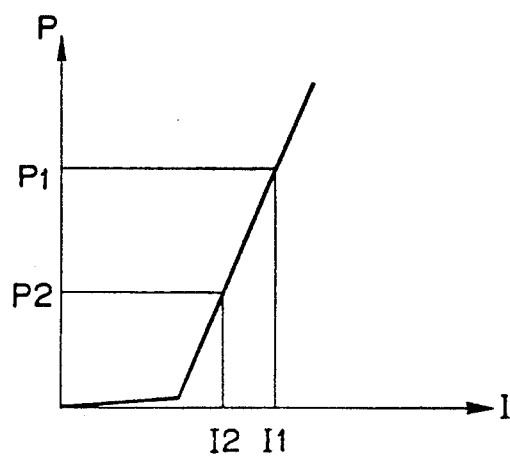
FIG. 2 is an explanatory view showing the relation between the inrush current of a semiconductor laser according to the present invention and the light output thereof.

FIG. 2 is a schematic view showing the relation between the current I flowing through the semiconductor laser and the light output P therefrom when the semiconductor laser shown in FIG. 1 is used as a light source means. In the drawing, the inrush current is shown on the abscissa, and the light output is shown on the ordinate.

In this embodiment, in a first mode in which the dot density is a normal dot density (standard dot density), e.g., the horizontal and vertical recording densities are 300 dpi $\times$ 300 dpi, the image information is recorded on the surface of the photosensitive drum 7 by the following process:

The inrush current is set to $I_1$ so that the light output from the laser 1 is $P_1$. At this time, the light reflected only from the alternate reflecting surfaces, i.e., the reflecting surfaces 3a, 3c, of a plurality of reflecting surfaces of the rotating polygon mirror 3 is used. Namely, the laser beam reflected from the reflecting surface 3a is detected by the light-receiving element 11 and horizontally synchronized so that the image information is recorded as one line on the surface of the photosensitive drum 7. Although the laser beam reflected from the next reflecting surface 3b is detected by the light-receiving element 11, at this time, the laser 1 no longer emits the laser beam based on the image information.

When the laser beam reflected from the reflecting surface 3c is then detected by the light-receiving element 11, the image information is written in the same way as the reflecting surface 3a.

In this way, the image information is recorded in the first mode.

In a second mode in which the horizontal and vertical dot densities are twice those in the first mode, i.e., the horizontal and vertical dot densities are 600 dpi $\times$ 600 dpi, the image information is recorded on the surface of the photosensitive drum 7 by the following process:

The image clock member is first doubled so that the horizontal dot density is doubled. The inrush current is set to $I_2$ so that the light output from the semiconductor laser is $P_2$ (half of $P_1$). The photosensitive drum 7 is optically scanned by the laser beam reflected from each of the reflecting surfaces 3a to 3d of the rotating polygon mirror 3 so that the image information is recorded with a dot density of twice that in the first mode in the subscanning direction (vertical direction).

During this time, the slice level of the light-receiving element 11 for detecting the horizontal synchronizing level is changed corresponding to the light output P from the laser. In this embodiment, the slice level is half of that in the first mode.

In this embodiment, the rotating polygon mirror 3 and the photosensitive drum (recording medium) 7 are rotated at constant speeds even when the dot density of the image information is changed, thereby attempting to stabilize the whole apparatus driven by a motor.

In this embodiment, in a third mode in which the dot density in the subscanning direction only is doubled, as compared with the first mode, i.e., the horizontal and vertical dot densities are 300 dpi×600 dpi, the image information may be recorded in the same way as in the second mode with the exception that the image clock number is the same as that in the first mode.

At this time, the light output from the laser beam source 1 is $P_2$.

EMBODIMENT 2

Figure 3:
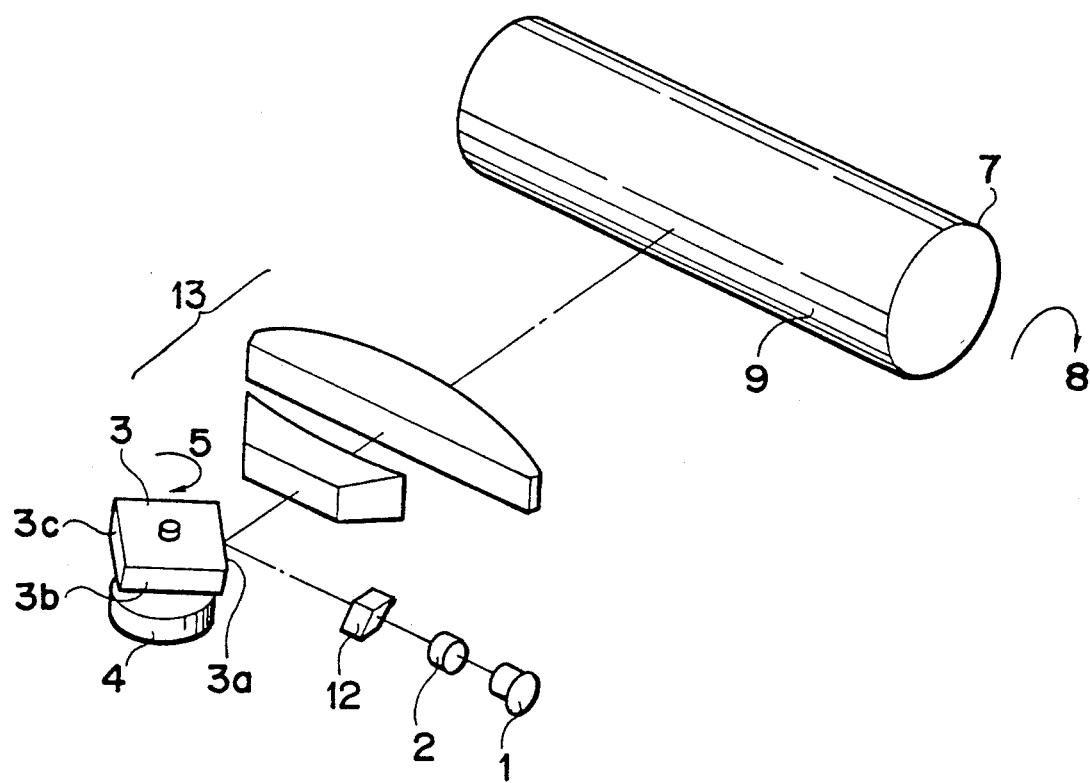
FIG. 3 is a schematic view showing a principal portion of a second embodiment of the present invention.

FIG. 3 is a schematic drawing showing a principal portion of a second embodiment of the present invention.

In the drawing, the same components as those shown in FIG. 1 are denoted by the same reference numerals.

This embodiment uses an inclination correcting optical system for correcting an inclination of each of the reflecting surfaces of the rotating polygon mirror 3, which is caused by production error, relative to a predetermined angle from the rotational shaft.

This embodiment is different from the first embodiment in that a cylindrical lens 12 forms a line image in a main scanning plane on a reflecting surface of the rotating polygon mirror 3 using the parallel light beam from the collimator lens 2, and an anamorphic lens 13 having the f-θ characteristics forms an image on the surface of the photosensitive drum 7 using the laser beam reflected from a reflecting surface of the rotating polygon mirror 3, thereby optically scanning the surface of the photosensitive drum 7.

In this embodiment, the inclination correcting optical system comprises the cylindrical lens 12 and the anamorphic lens 13 so that the inclination of each of the reflecting surfaces of the rotating polygon mirror 3 has no effect on the recording accuracy of the image information.

In each of the above embodiments, the dot density of the image information may be changed in a plurality (n: an integer of at least 2) of stages, not two stages, relative to the standard state (first mode).

In this case, the number of reflecting surfaces of the rotating polygon mirror is m×n (m; an integer), the image clock number (when the horizontal dot density is n times, the image clock number is also n times) and the light output (when the dot density in the subscanning direction is n times, the output is 1/n) from the laser beam source may be changed corresponding to the number of stages.

In addition, the slice level of the light-receiving element for detecting horizontal synchronism may also be changed corresponding to the value of the light output from the laser beam source.

The reflecting surfaces of the rotating polygon mirror are used (n−1) surfaces apart so that the image information can be recorded with a variable dot density like the above-described embodiments.

For example, when the dot density is twice the standard state, the light output of the laser beam may be changed by interposing an ND filter between the collimator lens and the deflecting unit or changing the diameter of the slit opening instead of changing the inrush current of the laser beam source.

The present invention enables the achievement of an image recording apparatus in which the reflecting surfaces used of a plurality of reflecting surfaces of the rotating polygon mirror and the image clock number are appropriately determined, as described above, thereby recording image information, with various dot densities and high accuracy, on the surface of the recording medium in the state where the rotating polygon mirror and the photosensitive drum are rotated at constant speeds while maintaining high rotational accuracy.

EMBODIMENT 3

Figure 4:
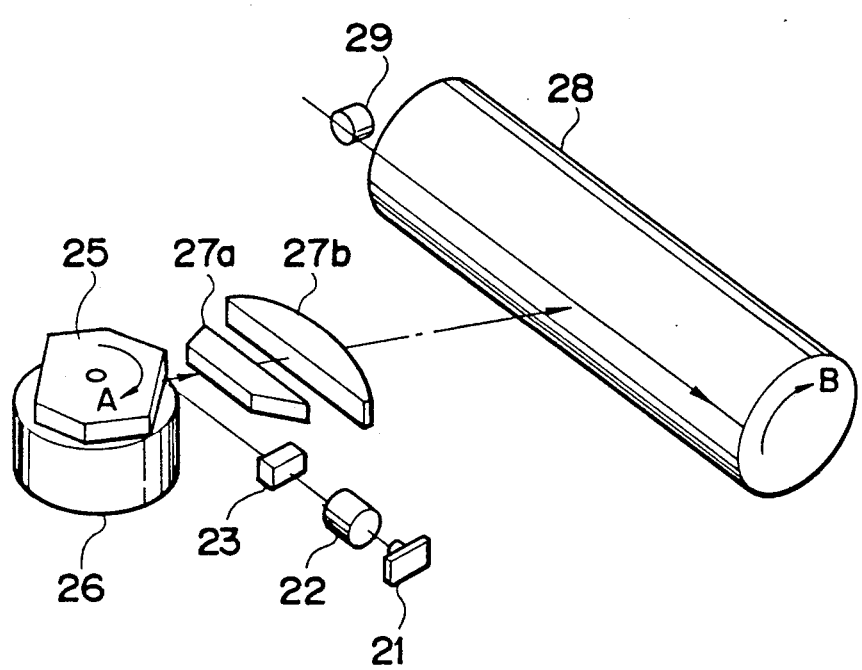
FIG. 4 is a perspective view showing the scanning optical system of a light scanning apparatus to which a third embodiment of the present invention is applied.

FIG. 4 shows the arrangement of a laser printer to which Embodiment 3 is applied to the present invention.

In FIG. 4, reference numeral 21 denotes a semiconductor laser element serving as a light source; reference numeral 22, a collimator lens for paralleling the divergent beam emitted from the semiconductor laser 21; reference numeral 23, a cylindrical lens; reference numeral 25, a rotating polygon mirror (referred to as "polygon" hereinafter) for deflecting the parallel laser beam; and reference numeral 26, a polygon motor for rotating the polygon 25 at a constant rotation number in the direction shown by arrow A. Reference numerals 27a, 27b denote an f-θ lens system for forming a spot image on a photosensitive drum 28 using the laser beam reflected and deflected by the polygon 25 so as to scan the photosensitive drum 28 at a constant speed. The photosensitive drum 28 is rotated at a constant rotation number in the direction shown by arrow B. Reference numeral 29 denotes a beam detector provided on the side of the scanning line starting end of the photosensitive drum 28 so as to detect the scanning laser beam and obtain a scanning start signal (BD signal).

In the above arrangement, the divergent laser beam emitted from the semiconductor laser 21 is made substantially parallel by the collimator lens 22, passed through the cylindrical lens 23 and then enters the polygon 25. The beam reflected and deflected by a polygon surface enters the f-θ lens system 27a, 27b.

The f-θ lens system 27a, 27b has different image-formation characteristics in the scanning direction (referred to as "main scanning direction" hereinafter) and the subscanning direction. This can be realized by using a toric or cylindrical surface.

The f-θ lens system 27a, 27b has the so-called f-θ characteristics in the main scanning direction that a spot image is formed on the surface of the photosensitive drum 28 by the parallel laser beam modulated by the polygon 25 for the purpose of scanning the photosensitive drum 28 at a constant speed. In the subscanning direction, the f-θ lens system 27a, 27b has the so-called inclination correcting function to form an image on the surface of the photosensitive drum 28 using the laser beam converged at a position near a reflecting surface of the polygon 25 by the cylindrical lens 23 so as to relieve the deviation of the scan line in the subscanning direction, which is caused by an inclination of each reflecting surface.

The scanning laser beam is passed through the beam detector 29 for each scanning to generate a BD signal for controlling the timing of the image signal control circuit (described below) so as to turn the laser beam on and off. At this time, the photosensitive drum 28 is rotated in the direction shown by arrow B, thereby forming a two-dimensional exposure distribution on the photosensitive drum 28 in accordance with the image signal.

The exposure distribution is recorded on an output medium such as paper or the like by a known electrophotographic process.

Figure 5:
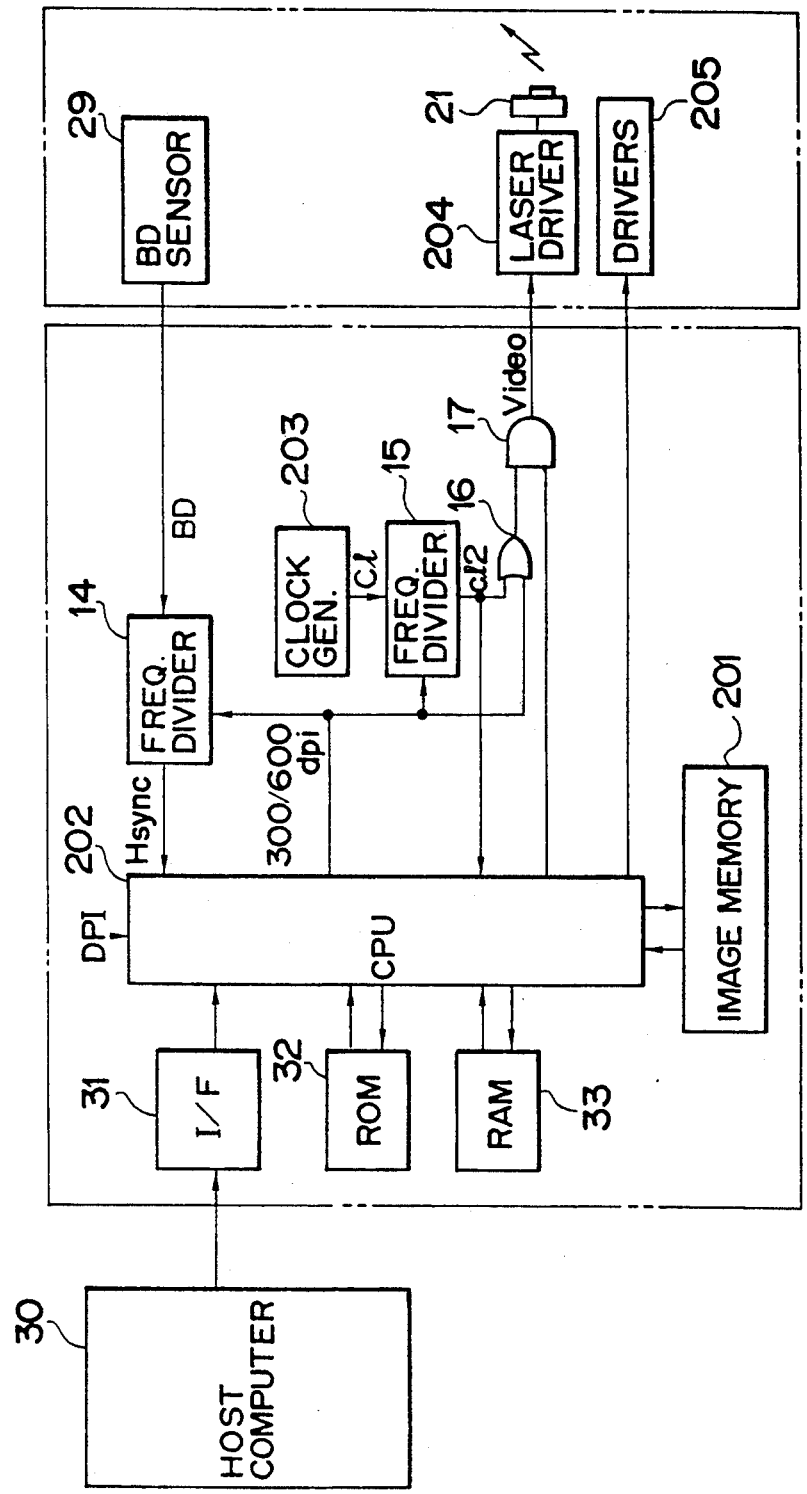
FIG. 5 is a block diagram of a control circuit in the third embodiment of the invention.

FIG. 5 is an example of block diagrams of the control circuit in this embodiment. In the drawing, reference numeral 201 denotes an image memory comprising an RAM having a size corresponding to resolution, an image size and gradation. For example, when this embodiment is applied to a binary printer with A-4 size output and 300 dpi/600 dpi changeable resolution, the capacity of the image memory 201 is expressed by the following equation:

$$\left( \frac{297}{25.4} \times 600 \times \frac{210}{25.4} \times 600 \right) \div 8 = 4 \text{ MByte}$$

This capacity represents the total data number with resolution of 600 dpi. When resolution of 300 dpi is used, the size of the image memory 201 may be ¼ of the above value, i.e., 1 MByte.

Reference numeral 202 denotes a CPU for receiving code data or the like output from a host computer 30 through an interface (I/F) 31. The CPU 202 also reads image data from the image memory 201 according to a resolution selecting signal DPI, a Hsync signal, a clock signal C12 and the like and outputs the data to a laser driver 204 after the data is converted into a Video signal by an OR circuit 17.

The laser driver 204 turns the semiconductor laser 21 on and off according to the Video signal. The CPU 202 instructs the driver 205 for each of the elements in the electrophotographic process to start and end the operation.

Figure 6:
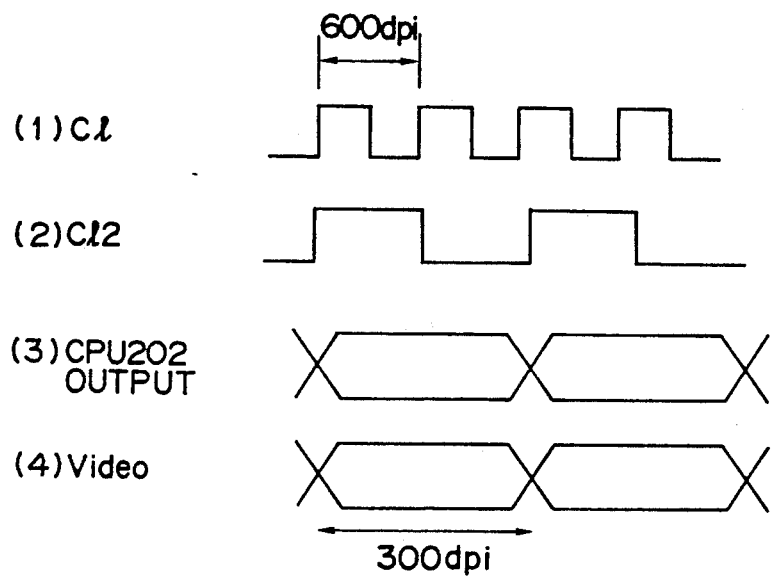
FIG. 6 is a timing chart of each of signals with output of 300 dpi in the third embodiment.
Figure 7:
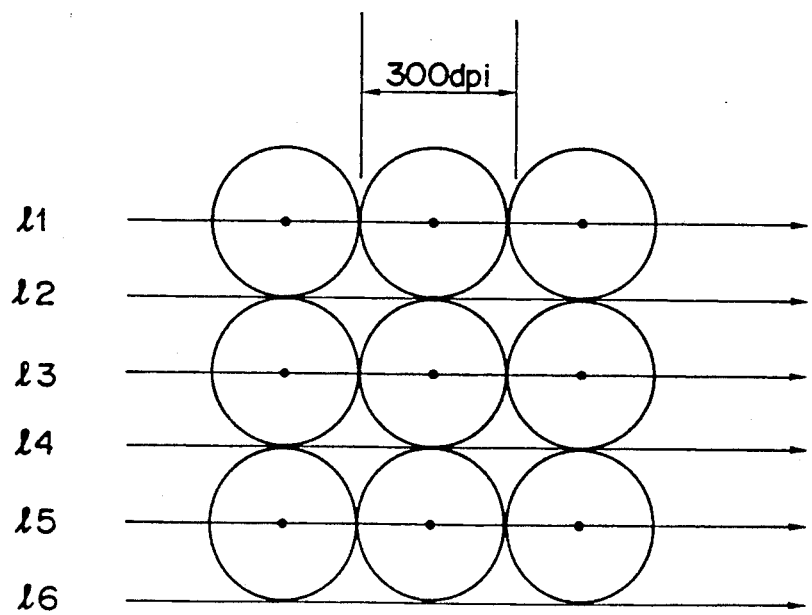
FIG. 7 is a view showing a printing pattern with output of 300 dpi in the third embodiment.

FIG. 6 is a timing chart showing timing with output of 300 dpi. With output of 300 dpi, the CPU 202 divides the basic clock signal C1 with 600 dpi in half by a divider 15 to form the clock signal C12 and outputs, to the laser driver 204, the data received from the image memory 201 as the video signal Video synchronously with the clock signal C12. In this embodiment, the rotation number of the polygon 25 is not changed by the resolution in the subscanning direction, but is fixed at a constant value corresponding to high resolution, i.e., 600 dpi. With output of 300 dpi, null scan is therefore performed for each scanning. FIG. 7 is a schematic drawing showing the two-dimensional printing pattern obtained on the photosensitive drum by the above process. The drawing shows a region corresponding to six scanning lines in which each black dot shows a place for printing image data, and each circle shows a region to be exposed by printing. In image printing with 300 dpi, the image data with 300 dpi is printed on the odd-numbered scanning lines 11, 13, 15 of the six scanning lines 11 to 16 shown in the drawing in the main scanning direction, and is not printed on the even-numbered scanning lines 12, 14, 16.

Namely, the CPU shown in FIG. 5 generates a 300/600 dpi switching signal on the basis of the resolution switching signal DPI generated on the basis of a command generated from the host computer or a signal output from a key input section (not shown). A divider 14 divides the BD signal on the basis of the 300/600 dpi switching signal. For example, the divider 14 comprises a toggle type flip-flop, a selector, a wave shaper and the like so as to send the Hsync signal to the CPU 202 for alternate BD signals with 300 dpi, thereby performing null scan for one scanning. The divider 14 also sends as the Hsync signal the pulse of each BD signal to the CPU 202 with 600 dpi.

With 300 dpi, the image signal is output synchronously with the clock signal C1 (FIG. 6(2)) produced by dividing the clock signal C1 (FIG. 6(1)) generated from a lock generator 203 for generating a clock with a duty of 50% by the divider 15. With 300 dpi, since the 300/600 dpi switching signal is handled as a signal of a high level corresponding to 300 dpi, the OR signal constantly outputs a high level. The image data (FIG. 6(3)) output from the CPU is therefore output as the video signal (FIG. 6(4)) to the laser driver 204 through an AND circuit 17, without any change in the duty.

Figure 8:
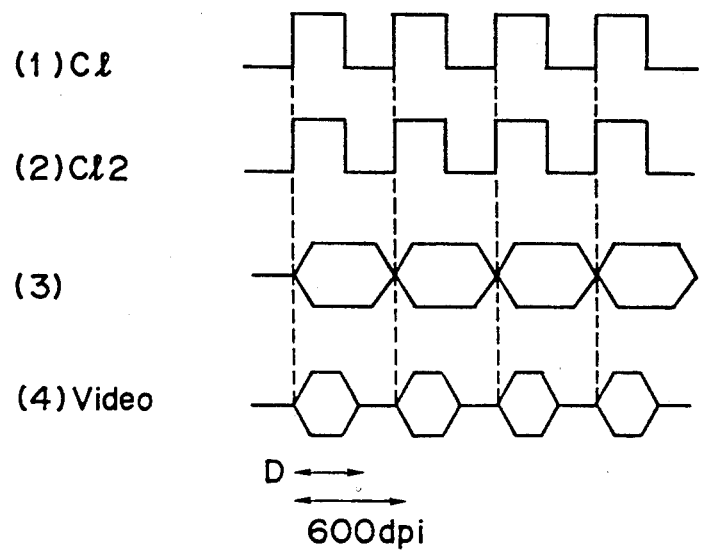
FIG. 8 is a timing chart of each of signals with output of 600 dpi in the third embodiment.
Figure 9:
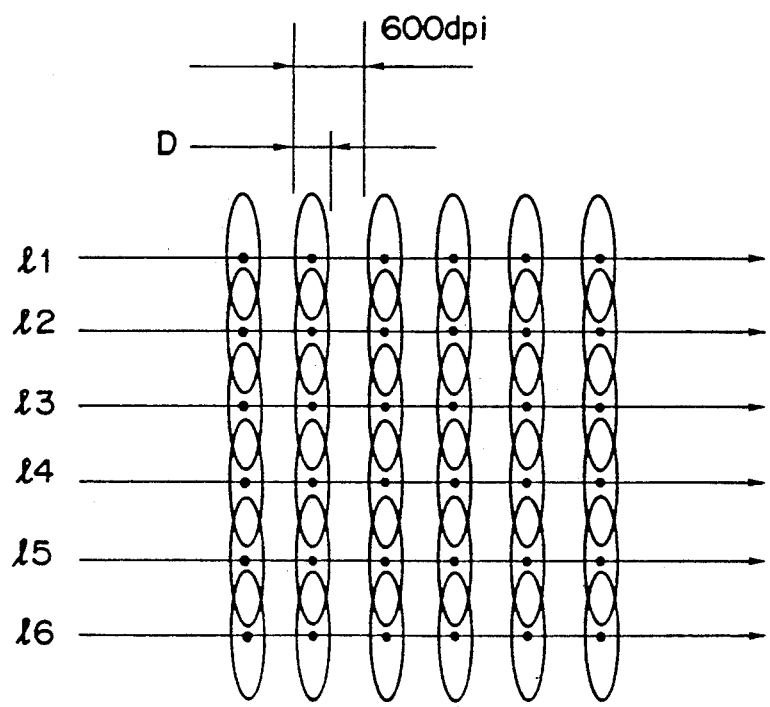
FIG. 9 is a view showing a printing pattern with output of 600 dpi in the third embodiment.

FIG. 8 shows a timing chart during printing with 600 dpi. In this case, the CPU 202 outputs the video signal Video to the laser driver 204 in synchronism with the basic clock C1. However, the video signal corresponding to one image data with output of 300 dpi is effective for a time corresponding to one pixel with 300 dpi (duty of 100%), while the effective time D for the video signal with output of 600 dpi is controlled to be half of the time corresponding to one pixel with 600 dpi (duty of 50%). FIG. 9 is a schematic drawing of a two-dimensional exposure pattern with output of 600 dpi. In the drawing, a region of six scanning lines 11 to 16 is shown in the same way as in FIG. 7. However, the image data is printed on all the scanning lines with 600 dpi, and the total area of the portions exposed in one scanning is half of that with 300 dpi. In this way, with output of 600 dpi, the dot density in the subscanning direction and exposure density are doubled, while the exposure area in the scanning direction is halved, so that the average exposure per unit area is the same as that with output of 300 dpi.

Namely, the divider 14 shown in FIG. 5 sends as the Hsync signal the pulse of each BD signal to the CPU 202 so that the image data (FIG. 8(3)) is output on all the scanning lines. The divider 15 outputs as the clock signal C12 (FIG. 8(2)) the clock signal C1 generated from the clock generator 203, and the image data is output synchronously with the clock signal C12. With output of 600 dpi, since the 300/600 dpi switching signal is a low level, the OR circuit 16 outputs a signal having the same waveform as that of the clock signal C12. The AND circuit 17 thus outputs the video signal with a duty of 50% shown in FIG. 8(4).

Modification

Figure 10:
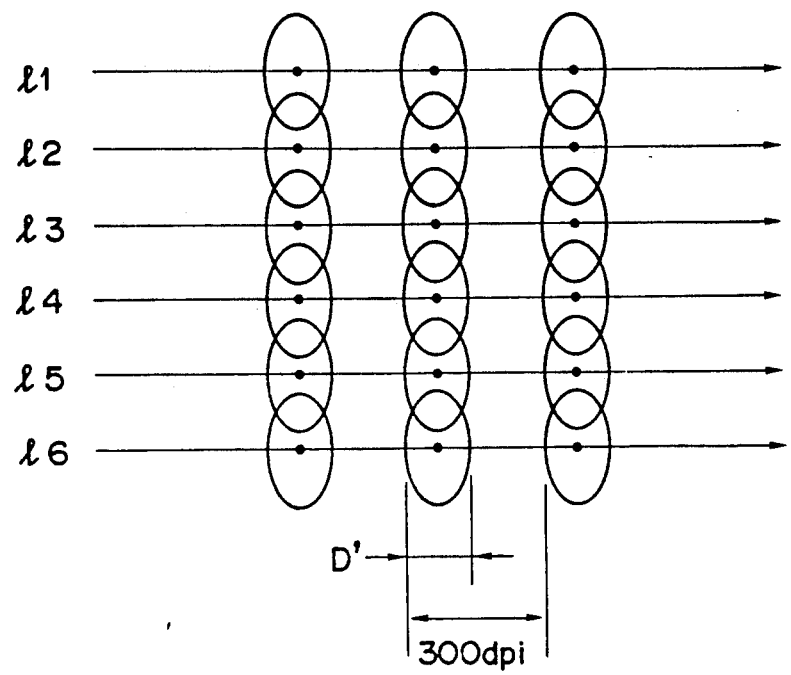
FIG. 10 is a view showing a printing pattern with a resolution of 600 dpi in the subscanning direction in the third embodiment.

Although, in the above embodiments, the pixel density is changed in both the main scanning and subscanning directions, the density in the subscanning direction only may be changed. FIG. 10 is a schematic drawing showing an exposure pattern when 300 dpi in the main scanning direction and 600 dpi subscanning direction are realized. Since the pixel density in the subscanning direction is doubled, the exposure is adjusted so that the duty in the main scanning direction is 50%, like the exposure patter shown in FIG. 9.

In this case, a switching signal with 600 dpi is input to the divider 14 shown in FIG. 5, and a switching signal with 300 dpi is input to the divider 15 and the OR circuit 16.

Although the area of non-printing portions in the main scanning direction is increased, the size of the scanning beam spot in the main scanning direction is equal to or greater than the main scanning printing pitch so as to prevent the non-printing portions from appearing on the output image. In FIG. 10, since the printing pitch is 300 dpi, i.e., about 84.7 $\mu$m, if the spot diameter (1/e2 diameter) in the main scanning direction is greater than 85 $\mu$, the non-printing portions between respective main scanning pixels are not resolved and thus have no influence on the output. Although, in the third embodiment, the pixel density in the subscanning direction is changed with an integral ratio between 300 and 600 dpi, the density can be changed within a wide range so far as the polygon rotation number can be changed.

Figure 11:
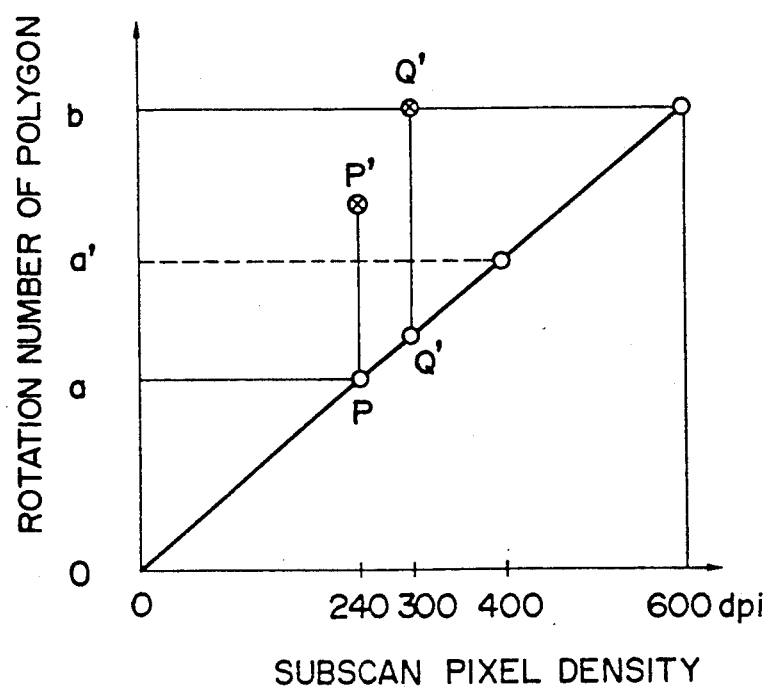
FIG. 11 is a graph for explaining the relation between the subscanning pixel density and the polygon rotation number in a modification of the third embodiment.

Since the pixel densities of printers which are generally used are 240, 300, 400, 600 dpi, the polygon rotation number must be changed according to the ratio between densities so as to correspond to each of the densities without changing the intensity of the laser beam. FIG. 11 shows the relation between the subscanning pixel density and the rotation number. For example, in order to provide a printer which complies with all the pixel densities of 240 to 600 dpi, it is necessary to control a polygon driving motor so as to stably rotate the polygon within a range of rotation numbers a to b with a density ratio of 2.5 (600/240=2.5), thereby imposing a great load on the motor and the control circuit. However, in this embodiment, for example, with subscanning output of 240 dpi, the polygon is rotated with the rotation number at point P' shown in FIG. 11 corresponding to subscanning output of 240 dpi, and with subscanning output of 300 dpi, the polygon is rotated with the rotation number at point Q' in the drawing corresponding to subscanning output of 600 dpi. In each of the scanning operations, when null scanning is performed for each scanning, and the quantity of light is controlled for each resolution value by changing the duty, the rotation number of the polygon may be controlled within the range of a' to b with a density ratio of 1.5 (600/400=1.5).

In addition, although it is described above that the density is completely inversely proportional to the duty, this embodiment is limited to this. For example, when the quantity of light necessary for exposing the photosensitive body is changed as the pixel density is changed in an electrostatic photographic process, the set duty may be slightly changed, or the intensity of the laser beam may be slightly change while maintaining the inverse proportional relation between the density and duty.

Figure 12:
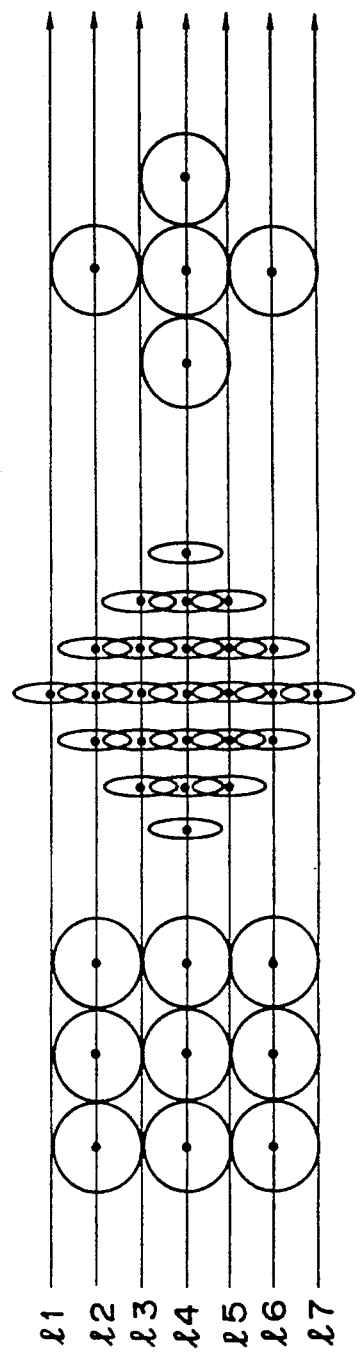
FIG. 12 is a view showing a printing pattern when the resolution is changed at an intermediate position in the subscanning direction in a modification of the third embodiment.

Further, in this embodiment, the image can be printed with different resolutions because it is possible to print an image with different resolutions even when the polygon rotation number is constant. This is shown in an example of printing in FIG. 12. The left portion in FIG. 12 shows the case where a rectangular having sides parallel with the scanning direction is printed with a pixel density, and the right portion in FIG. 12 shows the case where a rectangular having sides at an angle of 45° with respect to the scanning direction is printed with the same pixel density. In the left portion, since no oblique line, printing with low resolution has no adverse effect on the image quality. However, in the right portion, since there are many oblique lines, if the pixel pitch is large, the oblique lines are made uneven in the form of stairs, thereby deteriorating the image quality. As shown in the central portion of FIG. 12, printing with a high density and a half pixel pitch produces high-quality output. However, the preparation of all the data with a high pixel density brings about an increase in the capacity of the memory and is thus uneconomical. When, as occasion demands, the pixel density is thus changed in the image on one page, as described above, high-quality output can be obtained by a small-capacity memory.

Further, a memory corresponding to 300 dpi may be provided for normal printing with 300 dpi as well as other processing such as interpolation or the like so that printing with 600 dpi is performed.

In addition, although the embodiment concerns the case of printing on the basis of a binary image signal, the present invention can be applied to the case of printing on the basis of a many-valued image signal. For example, when gradient representation is performed by a laser beam which is subjected to PWM (pulse width modulation) on the basis of a multi-valued image signal, PWM is made at a duty ratio within the range of 0 to 100% with 300 dpi, and a duty ratio within the range of 0 to 50% with 600 dpi.

As described above, when the duty is changed with a change in the subscanning pixel density using null scanning, a plurality of subscanning pixel densities can be realized in a signal printer apparatus, and both the polygon rotation number and the quantity of the laser beam are made unnecessary or variable within a narrow range.

In addition, since the subscanning pixel density is made variable even with the same polygon rotation number, patterns with different pixel densities can be mixed in the same output image.

EMBODIMENT 4

Figure 13:
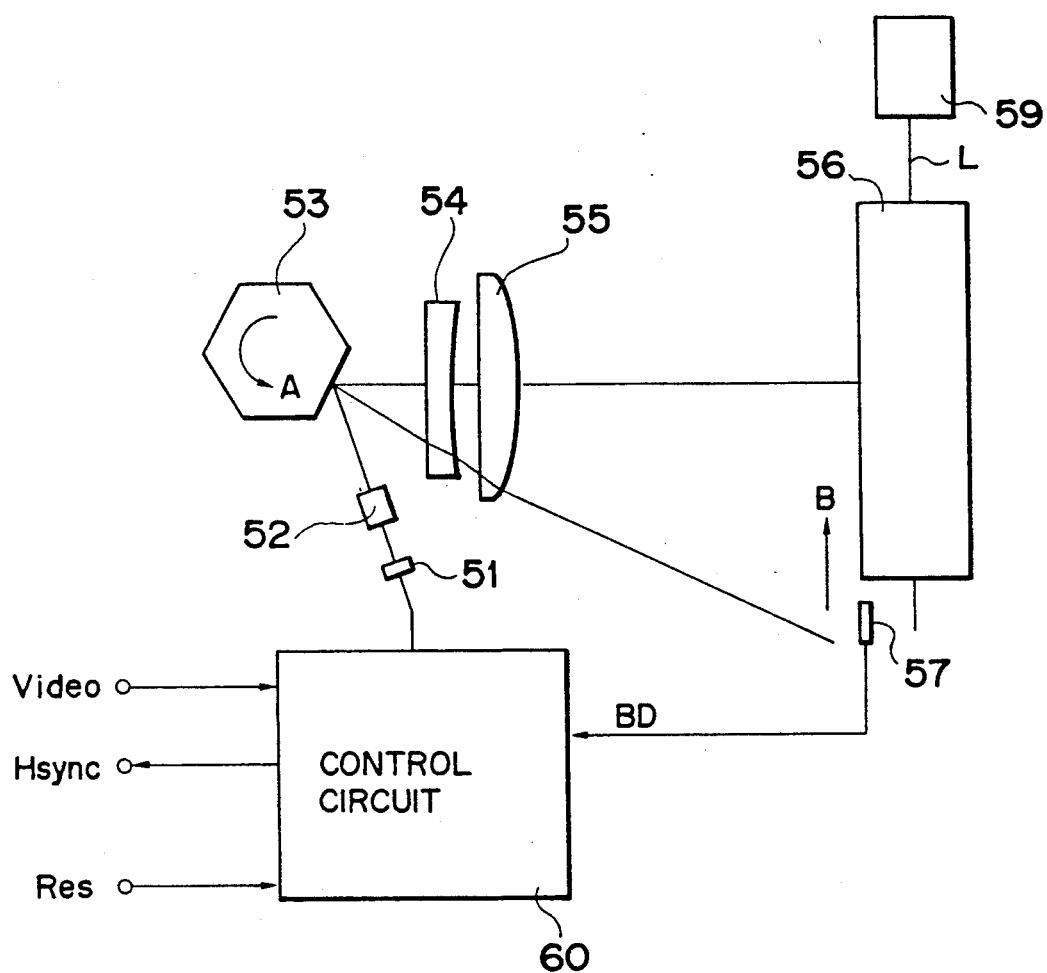
FIG. 13 is a view showing a scanning optical system and a control circuit in a fourth embodiment of the invention.

FIG. 13 shows a scanning optical system and a control section in a laser beam printer to which Embodiment 4 is applied. In the drawing, reference numeral 51 denotes a semiconductor laser serving as a light source; reference numeral 52 a collimator for making the divergent beam emitted from the semiconductor laser 51 a substantially parallel beam; and reference numeral 53, a polygon mirror serving as a deflecting unit and rotated in the direction shown by arrow A. Reference numerals 54, 55 denote an image-forming lens system having the function to form an image on the photosensitive body 56 described below by the laser beam deflected by the polygon mirror 53 so as to scan the photosensitive body 56 at a constant speed.

The polygon mirror 53 and the image-forming lens system 54, 55 cause the laser beam emitted from the semiconductor laser 51 to scan the photosensitive drum 56 with a constant period in the direction shown by arrow B.

The drawing shows a side view of the cylindrical photosensitive body 56. The photosensitive body 56 is rotated around the axis L serving as a rotational axis with a constant rotation number. The surface of the photosensitive body 56 is thus moved for a certain length during the scanning period of the laser beam, and the relative position of the scanning line is moved vertically (subscanning direction) to the scanning direction, thereby producing spaces between respective pixels in the subscanning direction. Reference numeral 59 denotes a motor for rotating the photosensitive body 56.

Reference numeral 57 denotes a photo detector disposed at the starting position of laser beam scanning for detecting the passage of the laser beam and generating a light detecting signal (BD signal).

Reference numeral 60 denotes a control circuit having the configuration described below. The control circuit 60 receives the BD signal generated from the photodetector 57 and is connected to an external host through a signal line.

An input Res signal is a signal for indicating the subscanning pixel density and is set to, for example, 600 dpi in a high level and 300 dpi in a low level. An output Hsync signal is a horizontal synchronizing signal for adjusting the writing position in the scanning direction, and an input Video signal is an image signal from the host.

Figure 14:
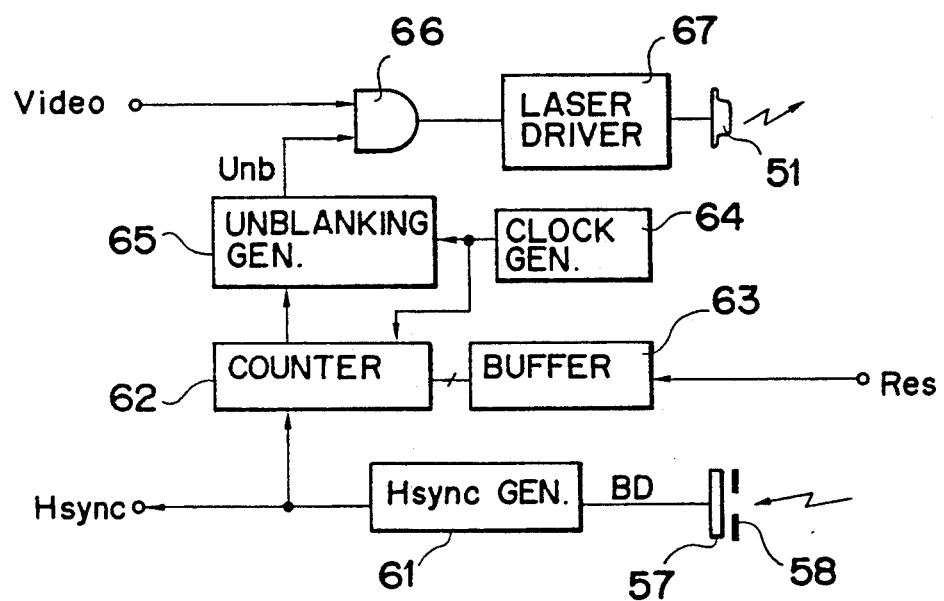
FIG. 14 is a block diagram of a control circuit in the fourth embodiment.

FIG. 14 is a block diagram showing an example of control circuits in the fourth embodiment.

Reference numeral 61 denotes a horizontal synchronizing signal generator circuit; and reference numeral 62, a down counter reset by the Hsync signal and loaded with an initial value corresponding to the signal Res indicating the subscanning pixel density from a buffer 63.

Reference numeral 65 denotes an unblanking signal generator circuit for making an unblanking signal Unb the high level during a predetermined period in synchronism with the borrow signal generated from the counter 62. The unblanking signal Unb is a signal for forcing the laser to be turned on in order to obtain the BD signal.

During a printing operation, the Hsync generator circuit shapes the BD signal output from the photodetector 57 to generate the Hsync signal. The Hsync signal is transmitted to the host which thus starts to transmit the image signal Video in synchronism with the Hsync signal. The video signal is passed through an OR gate 66 and input to a laser driver 67 which thus turns the semiconductor laser 51 on and off according to the level of the video signal. The Hsync signal is also a reset signal for the counter 62. When the Hsync signal and the preset value output from the buffer 63 are simultaneously read, the counter 62 is counted down by the clock generated from a clock generator circuit 64.

Reference numeral 66 denotes the OR gate implementing the OR operation of the unblanking signal Unb and the video signal Video and outputting the result to the laser driver 67.

The laser drive 67 turns the laser on when the input is the high level and turns it off when the input is the L level.

When counting down is completed, the borrow signal is sent to the unblanking signal generator circuit 65. When the unblanking signal generator circuit 65 receives the borrow signal, it generates the unblanking signal Unb which is then sent to the laser driver through the OR gate so as to force the semiconductor laser element to be turned on. At this time, when the laser spot is passed through the photodetector, the next Hsync signal is obtained.

Numeric values corresponding to subscanning pixel densities are previously stored in the buffer 63 so that one of the values is selected according to the subscanning pixel density indicating signal Res transmitted from the host side and used as the preset value for the counter 62.

When the pixel density is highest, i.e., when the deflection period of the optical axis of the scanning system is equal to the light scanning period, the count value is set so that the counting down of the counter 62 is ended within a time slightly shorter than the deflection period. At the same time, the Hsync signal is generated at each deflection of the optical axis.

Figure 15:
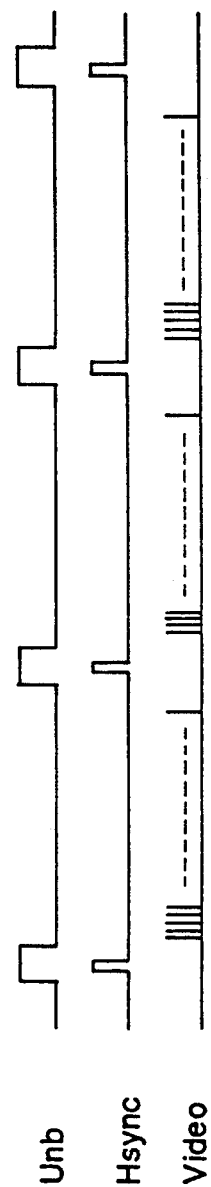
FIG. 15 is a timing chart with a maximum subscanning dot density in the fourth embodiment.

FIG. 15 shows the timing chart in this case where the pixel density is high.

After the Hsync signal is generated, when the video signal is sent from the host, the laser is turned on and off, thereby performing exposure for one scanning. The laser is then turned on by the unblanking signal Unb immediately before the optical axis deflected is again passed through the photodetector, and the Hsync signal is again generated by the light detection signal BD.

When the pixel density may be low, for example, 1/n (in this embodiment, n=2) of the highest density, the count value is set so that the counting down is ended within a time slightly shorter than the time of n times the deflection period.

Figure 16:
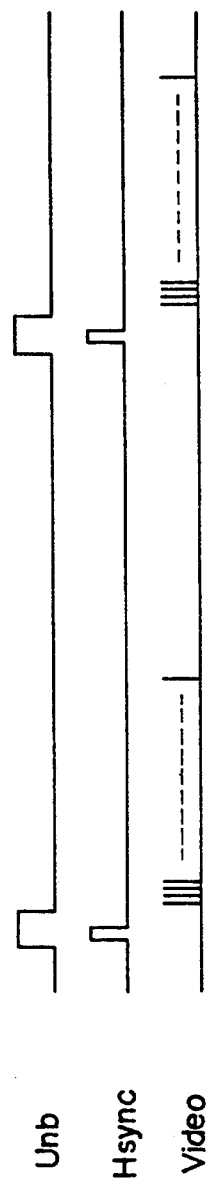
FIG. 16 is a timing chart with half subscanning dot density in the fourth embodiment.

At the same time, one Hsync signal is generated for n deflections. FIG. 16 shows the timing chart when n=2.

After the Hsync signal is generated, when the video signal is transmitted from the host, the laser is turned on and off for performing exposure for one scanning. The laser is then turned on by the unblanking signal Unb immediately before the deflected optical axis is passed through the photodetector at the second time, and the Hsync signal is gain generated by the light detection signal BD. As seen from FIG. 16, the period of the horizontal synchronizing signal Hsync is twice that of the signal shown in FIG. 15. Since the photosensitive drum is moved for an amount twice that in the case shown in FIG. 15 during this period, the pixel space in the subscanning direction is increased, whereby the pixel density can be halved. During this time, the light beam is not modulated by the recording signal in the later period even during the time between the horizontal synchronizing signals Hsync.

Since the polygon rotation number is the same in both cases shown in FIGS. 15 and 16, the relation between the image clock and the main scanning pixel density is the same. If the main scanning pixel density is the same, the video signal need not to be changed on the host side.

EMBODIMENT 5

Figure 17:
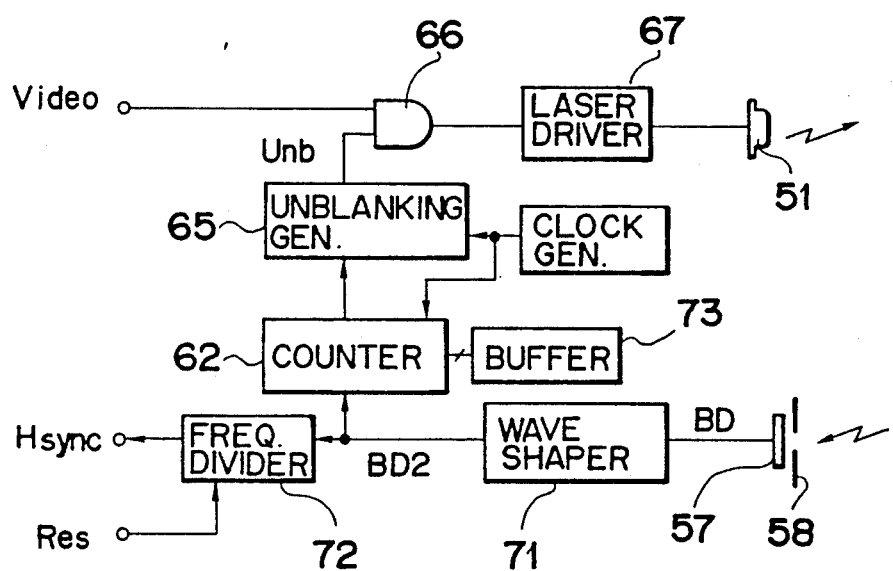
FIG. 17 is a block diagram of the control circuit in a fifth embodiment of the present invention.

FIG. 17 shows a control section in a fifth embodiment of the present invention in which the same components as those shown in FIG. 14 are denoted by the same reference numerals.

Reference numeral 71 denotes a wave shaper for shaping the light detection (BD) signal to generate a signal BD2. The down counter 62 is reset by the signal BD2 and is loaded with a preset value from a buffer 73 so as to start the unblanking signal generator circuit 65 with predetermined timing. The preset value is set to a single value so that the unblanking signal is generated at each deflection of the optical axis.

Reference numeral 72 denotes a frequency divider for dividing the signal BD2 to generate the Hsync signal. The divider 72 is configured so that the dividing ratio can be changed according to the subscanning pixel density controlling signal Res.

In this arrangement, although the signal BD2 is generated at each deflection of the optical axis, the period of the signal Hsync can be changed by changing the setting of the frequency divider 72, like the first embodiment.

As described above, the subscanning pixel density is changed by changing the ratio between the optical axis deflection period and the horizontal synchronizing signal period, whereby the subscanning pixel density can be changed without changing the polygon rotation number.

It is therefore possible to easily control the rotation of the polygon, decrease the cost and decrease the load on the host side because a constant relation between the image clock and the main scanning pixel density is maintained.

The above-described embodiments can be combined at will.

The present invention is not limited to the above embodiments and combination thereof, and various changes can be made within the scope of the claims.

What is claimed is:

1. An image recording apparatus comprising:
   beam generating means for generating a light beam modulated in accordance with an image signal input to said beam generating means;
   beam deflecting means for scanning a recording medium using the light beam generated by said beam generating means, said beam deflecting means comprising a rotating polygon mirror having plural reflecting surfaces; and
   control means for operating said apparatus in a first mode for forming an image on the recording medium using all said plural reflecting surface of said rotating polygon mirror and in a second mode for forming an image on the recording medium using predetermined reflecting surfaces of said plural reflecting surfaces of said rotating polygon mirror.

2. An image recording apparatus according to claim 1, wherein said control means operates said apparatus in the first or second mode in correspondence to dot density of a recording image in a subscanning direction.

3. An image recording apparatus according to claim 1, further comprising a communication clock having a changeable frequency for communicating the image signal, wherein dot density in a main scanning direction is changeable by changing the frequency of said communication clock.

4. An image recording apparatus according to claim 1, further comprising beam detecting means for detecting the light beam deflected by said deflecting means at a predetermined position, and for generating a period signal for determining transmission start timing of the image signal for one line, wherein said beam detecting means changes a slice level for detecting the deflected light beam corresponding to dot density at least in a subscanning direction.

5. An image recording apparatus comprising:
   beam generating means for generating a light beam modulated in accordance with an image signal input to said beam generation means;
   first scanning means for scanning a recording medium line-by-line using the light beam generated by said beam generating means in a main scanning direction; and
   second scanning means for scanning the recording medium using the light beam generated by said beam generating means in a subscanning direction; wherein said first scanning means is operable to generate one or more non-modulation main scans between respective main scans using the light beam modulated based on the image signal, whereby dot density in the subscanning direction can be changed.

6. An image recording apparatus according to claim 5, wherein said beam generation means generates the modulated light beam in accordance with a modulation ratio which is changed according to the subscanning dot density.

7. An image recording apparatus according to claim 5, further comprising a communication clock having a changeable frequency for communicating the image signal, wherein dot density in a main scanning direction is changeable by changing the frequency of said communication clock.

8. An image recording apparatus according to claim 5, further comprising:
   beam detecting means for detecting the light beam scanned by said first and second light scanning means at a predetermined position; and
   synchronizing signal generating means for generating a synchronizing signal for determining transmission start timing of the image signal for one line on the basis of a detecting signal generated from said beam detecting means, said synchronizing signal generating means outputting a synchronizing signal with a period different from a period of scanning by said first scanning means.

9. An image recording apparatus according to claim 8, wherein said synchronizing signal generating means divides the detecting signal with a dividing ratio corresponding to dot density in the subscanning direction and outputs the synchronizing signal.

10. An image recording apparatus according to claim 5, wherein said first scanning means scans in the main scan direction at a changeable speed and wherein dot density in the subscanning direction is changeable by changing the speed of main scanning by said first scanning means.

11. An image recording apparatus according to claim 5, wherein said first scanning means is comprised by a rotating polygon mirror.

12. An image recording apparatus according to claim 5, further comprising means for forming an image from the scanned recording medium by an electrophotographic process.

13. An image recording apparatus comprising:
   beam generating means for generating a light beam modulated in accordance with an image signal input to said beam generating means;
   first scanning means for scanning a recording medium line-by-line using the light beam generated by said beam generating means in a main scanning direction; and
   second scanning means for scanning the recording medium using the light beam generated by said beam generating means in a subscanning direction;
   beam detecting means for detecting the light beam scanned by said first and second scanning means at a predetermined position; and
   synchronizing signal generating means for generating a synchronizing signal for determining transmission start timing of the image signal for one line on the basis of a detecting signal generated from said beam detecting means, said synchronizing signal generating means outputting the synchronizing signal with a period different from a period of the detecting signal generated from said beam detecting means.

14. An image recording apparatus according to claim 13, wherein said synchronizing signal generating means divides the detecting signal with a dividing ratio corresponding to dot density in the subscanning direction and outputs the synchronizing signal.

15. An image recording apparatus according to claim 5, wherein said first scanning means scans in the main scan direction at a changeable speed and wherein dot density in the subscanning direction is changeable by changing the speed of main scanning by said first scanning means.

16. An image recording apparatus according to claim 5, wherein said first scanning means is comprised by a rotating polygon mirror.

17. An image recording apparatus according to claim 5, further comprising means for forming an image from the scanned recording medium by an electrophotographic process.

* * * * *

UNITED STATES PATENT AND TRADEMARK OFFICE
CERTIFICATE OF CORRECTION

PATENT NO. : 5,323,183
DATED : June 21, 1994
INVENTOR(S) : Masamichi Tateoka and Toshinori Ando It is certified that error appears in the above-identified patent and that said Letters Patent is hereby corrected as shown below:

Column 4, line 66, change "member" to --number--.

Signed and Sealed this

Twentieth Day of December, 1994

Attest:

BRUCE LEHMAN

*Attesting Officer*     *Commissioner of Patents and Trademarks*